United States Patent
Kang

(10) Patent No.: US 8,772,958 B2
(45) Date of Patent: Jul. 8, 2014

(54) WIND POWER GENERATING APPARATUS

(75) Inventor: Hyun Moon Kang, Gyeonggi-do (KR)

(73) Assignee: Sun Sook An, Gyeonggi-Do (KR)

( * ) Notice: Subject to any disclaimer, the term of this patent is extended or adjusted under 35 U.S.C. 154(b) by 0 days.

(21) Appl. No.: 13/508,695

(22) PCT Filed: Nov. 3, 2010

(86) PCT No.: PCT/KR2010/007687
§ 371 (c)(1),
(2), (4) Date: May 8, 2012

(87) PCT Pub. No.: WO2011/055962
PCT Pub. Date: May 12, 2011

(65) Prior Publication Data
US 2012/0223527 A1   Sep. 6, 2012

(30) Foreign Application Priority Data

Nov. 9, 2009 (KR) .......................... 10-2009-0107409

(51) Int. Cl.
| | | |
|---|---|---|
| *F03D 9/00* | (2006.01) | |
| *H02P 9/04* | (2006.01) | |
| *F01D 1/24* | (2006.01) | |
| *F03D 1/02* | (2006.01) | |
| *F04D 29/18* | (2006.01) | |
| *B64C 11/48* | (2006.01) | |

(52) U.S. Cl.
USPC ............................................................. 290/55

(58) Field of Classification Search
USPC ...................................... 290/44, 55; 416/128
See application file for complete search history.

(56) References Cited

U.S. PATENT DOCUMENTS

| 187,440 A | * | 2/1877 | Wheeler, Jr. .................... 416/10 |
| 1,015,505 A | * | 1/1912 | Moon et al. .................... 416/164 |

(Continued)

FOREIGN PATENT DOCUMENTS

| JP | 2007211667 | 8/2007 |
| KR | 200379582 | 3/2005 |
| KR | 20070059317 | 6/2007 |

OTHER PUBLICATIONS

International Search Report and Written Opinion from corresponding PCT Application No. PCT Application No. PCT/KR2010/007687, 5 pages, dated May 18, 2011.

*Primary Examiner* — Pedro J Cuevas
(74) *Attorney, Agent, or Firm* — Dardi & Herbert, PLLC; Curtis B. Herbert

(57) ABSTRACT

The present invention provides a wind power generator comprising: a case; a first rotor having a first main axis in the form of a hollow shaft rotatably installed within a part of said case, a first main wing, coils or a permanent magnet installed on said first main axis; a first stator having a permanent magnet or coils installed on an inner wall of said case; a first auxiliary wing mounted to an end of a first inner axis which is rotatably installed within said first main axis; a second rotor having a second main axis in the form of a hollow shaft rotatably installed within the other part of said case, a second main wing, coils or a permanent magnet installed on said second main axis; a second stator having a permanent magnet or coils installed on the inner wall of said case; and a second auxiliary wing mounted to an end of a second inner axis which is rotatably installed within said second main axis, wherein said first main wing and said second main wing rotate in rotational directions opposite to those of said first auxiliary wing and said second auxiliary wing, respectively, and, wherein the rotational force of said first inner axis and the rotational force of said second inner axis may be transmitted to said second main axis and said first main axis, respectively.

4 Claims, 3 Drawing Sheets

(56) References Cited

U.S. PATENT DOCUMENTS

| | | | | |
|---|---|---|---|---|
| 1,142,502 A * | 6/1915 | Donnelly | | 416/9 |
| 1,266,518 A * | 5/1918 | Mulrony | | 416/124 |
| 1,489,817 A * | 4/1924 | Campbell | | 416/128 |
| 1,498,978 A * | 6/1924 | Muntz | | 416/85 |
| 1,504,259 A * | 8/1924 | Miller | | 416/194 |
| 1,963,912 A * | 6/1934 | Honnef | | 416/121 |
| 2,153,523 A * | 4/1939 | Edmonds et al. | | 290/55 |
| 2,177,801 A * | 10/1939 | Erren | | 290/55 |
| 2,388,377 A * | 11/1945 | Albers | | 290/55 |
| 2,563,279 A * | 8/1951 | Rushing | | 415/4.3 |
| 2,653,250 A * | 9/1953 | Romani | | 290/4 C |
| 3,032,119 A * | 5/1962 | Hachmann | | 416/200 R |
| 3,867,062 A * | 2/1975 | Troller | | 415/194 |
| 3,942,026 A * | 3/1976 | Carter | | 290/55 |
| 4,039,848 A * | 8/1977 | Winderl | | 290/55 |
| 4,065,225 A * | 12/1977 | Allison | | 416/121 |
| 4,087,196 A * | 5/1978 | Kronmiller | | 415/4.5 |
| 4,213,057 A * | 7/1980 | Are | | 290/44 |
| 4,217,501 A * | 8/1980 | Allison | | 290/55 |
| 4,345,161 A * | 8/1982 | Crompton | | 290/55 |
| 4,642,029 A * | 2/1987 | Cedoz | | 416/129 |
| 4,936,746 A * | 6/1990 | Mayo et al. | | 416/46 |
| 5,054,998 A * | 10/1991 | Davenport | | 416/1 |
| 5,506,453 A * | 4/1996 | McCombs | | 290/44 |
| 5,760,515 A * | 6/1998 | Burns | | 310/115 |
| 6,127,739 A * | 10/2000 | Appa | | 290/55 |
| 6,278,197 B1 * | 8/2001 | Appa | | 290/55 |
| 6,476,513 B1 * | 11/2002 | Gueorguiev | | 290/55 |
| 6,492,743 B1 * | 12/2002 | Appa | | 290/55 |
| 6,504,260 B1 * | 1/2003 | Debleser | | 290/44 |
| 6,761,144 B2 * | 7/2004 | Schwam | | 123/242 |
| 6,856,042 B1 * | 2/2005 | Kubota | | 290/55 |
| 6,945,747 B1 * | 9/2005 | Miller | | 415/4.3 |
| 6,975,045 B2 * | 12/2005 | Kurachi et al. | | 290/44 |
| 7,074,011 B1 * | 7/2006 | Wobben | | 416/126 |
| 7,102,249 B2 * | 9/2006 | Wobben | | 290/55 |
| 7,199,484 B2 * | 4/2007 | Brashears | | 290/54 |
| 7,384,239 B2 * | 6/2008 | Wacinski | | 416/128 |
| 7,582,981 B1 * | 9/2009 | Meller | | 290/44 |
| 7,709,973 B2 * | 5/2010 | Meller | | 290/55 |
| 7,723,861 B2 * | 5/2010 | Meller | | 290/55 |
| 7,777,360 B2 * | 8/2010 | Hong | | 290/55 |
| 7,821,149 B2 * | 10/2010 | Meller | | 290/44 |
| 7,830,033 B2 * | 11/2010 | Meller | | 290/55 |
| 7,923,854 B1 * | 4/2011 | Meller | | 290/55 |
| 8,026,626 B1 * | 9/2011 | Meller | | 290/55 |
| 8,070,444 B2 * | 12/2011 | Clarke et al. | | 416/124 |
| 8,178,992 B1 * | 5/2012 | Meller | | 290/55 |
| 8,264,096 B2 * | 9/2012 | Micu | | 290/55 |
| 8,354,759 B2 * | 1/2013 | Marchand | | 290/55 |
| 8,382,430 B2 * | 2/2013 | Parry et al. | | 416/1 |
| 8,438,829 B2 * | 5/2013 | Negulescu | | 60/39.183 |
| 8,454,313 B2 * | 6/2013 | Elkin et al. | | 416/132 B |
| 8,461,713 B2 * | 6/2013 | Sammy | | 290/55 |
| 2003/0006614 A1 * | 1/2003 | Appa | | 290/55 |
| 2004/0096327 A1 * | 5/2004 | Appa et al. | | 416/1 |
| 2006/0093482 A1 * | 5/2006 | Wacinski | | 416/128 |
| 2006/0125243 A1 * | 6/2006 | Miller | | 290/55 |
| 2008/0197639 A1 * | 8/2008 | Brander | | 290/55 |
| 2010/0066093 A1 * | 3/2010 | Meller | | 290/55 |
| 2010/0066095 A1 * | 3/2010 | Meller | | 290/55 |
| 2010/0090468 A1 * | 4/2010 | Hong | | 290/55 |
| 2010/0111697 A1 * | 5/2010 | Wood | | 416/128 |
| 2010/0215502 A1 * | 8/2010 | Harrison | | 416/205 |
| 2010/0230967 A1 * | 9/2010 | Heo | | 290/44 |
| 2010/0259050 A1 * | 10/2010 | Meller | | 290/55 |
| 2010/0296929 A1 * | 11/2010 | Shuto et al. | | 416/128 |
| 2010/0310361 A1 * | 12/2010 | Carre | | 415/199.5 |
| 2011/0012361 A1 * | 1/2011 | Lee | | 290/55 |
| 2011/0037268 A1 * | 2/2011 | Sammy | | 290/55 |
| 2011/0305570 A1 * | 12/2011 | Shin et al. | | 416/33 |
| 2012/0019006 A1 * | 1/2012 | Bitar | | 290/1 |
| 2012/0074712 A1 * | 3/2012 | Bursal | | 290/55 |
| 2012/0091721 A1 * | 4/2012 | Kanemoto | | 290/55 |
| 2013/0011259 A1 * | 1/2013 | Balk et al. | | 416/128 |
| 2013/0052016 A1 * | 2/2013 | Szymandera | | 416/128 |
| 2013/0277971 A1 * | 10/2013 | Cho et al. | | 290/44 |
| 2013/0284608 A1 * | 10/2013 | Blake et al. | | 205/464 |
| 2013/0336775 A1 * | 12/2013 | Blake et al. | | 415/207 |
| 2014/0008915 A1 * | 1/2014 | Ribarov et al. | | 290/55 |
| 2014/0015255 A1 * | 1/2014 | Schellstede | | 290/55 |
| 2014/0021722 A1 * | 1/2014 | Jakubaszek | | 290/55 |

* cited by examiner

WIND POWER GENERATING APPARATUS

CROSS REFERENCE TO RELATED APPLICATIONS

This application is a national stage filing of PCT Application PCT/KR2010/007687 filed Nov. 3, 2010, which claims priority to Korean Patent Application No. 10-2009-0107409 filed Nov. 9, 2009, both of which applications are hereby incorporated by reference herein.

TECHNICAL FIELD

The present invention relates to a wind power generator, and more particularly to a wind power generator with a pair of generating means, wherein the pair of the generating means comprising stators and rotors are installed within a case fixed at the top of a pillar and wherein the pair of the generating means are operated by rotational forces of wings rotating in opposite directions to each other to thereby improve the generating efficiency.

BACKGROUND ART

Currently, as the price of oil, i.e. the price of fossil fuel raises and the environment pollution appears as an issue, people get interested in the wind power generator which generates electricity using wind power without causing any pollutant substance.

Conventionally, the wind power generator is configured in such a way that the wing is rotated by means of the wind power to thereby rotate a shaft; a permanent magnet serving as a rotor is mounted to the shaft; and coils serving as a stator are installed in the generator to correspond to the rotor.

This type of the wind power generator has its restriction in improving the generating efficiency, because the permanent magnet is rotated using the wind power so as to make the electricity to flow through the coil.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

Thus, the object of the present invention is to provide a wind power generator which has a pair of generating means installed in a single case, wherein the pair of generating means operate simultaneously by means of the rotating forces of the wings installed at either end of the case, so that the generating efficiency can be improved.

Another object of the present invention is to make the pair of the generating means to mutually compensate the rotating forces to thereby improve the generating efficiency.

In one aspect, the present invention provides a wind power generator comprising: a case; a first rotor having a first main axis in the form of a hollow shaft rotatably installed within a part of said case, a first main wing mounted to an end of said first main axis, coils or a permanent magnet installed on said first main axis; a first stator having a permanent magnet or coils installed on an inner wall of said case to correspond to said first rotor; a first auxiliary wing mounted to an end of a first inner axis which is rotatably installed within said first main axis; a second rotor having a second main axis in the form of a hollow shaft rotatably installed within the other part of said case, a second main wing mounted to an end of said second main axis, coils or a permanent magnet installed on said second main axis; a second stator having a permanent magnet or coils installed on the inner wall of said case to correspond to said second rotor; a second auxiliary wing mounted to an end of a second inner axis which is rotatably installed within said second main axis, wherein said first main wing and said second main wing rotate in rotational directions opposite to those of said first auxiliary wing and said second auxiliary wing, respectively, and wherein the rotational force of said first inner axis and the rotational force of said second inner axis may be transmitted to said second main axis and said first main axis, respectively.

In an exemplary embodiment, the case is installed on the top of a pillar erected on the ground to be rotatable in dependence of a wind direction.

In another exemplary embodiment, the rotational force of the first inner axis is transmitted to the second main axis by means of: a first gear part formed at an inside end of the second main axis; a first drive gear coupled to an inside end of the first inner axis; a first transmission axis rotatably supported by a support within the case to extend horizontally; a first transmission gear installed at one end of the first transmission axis to engage the first drive gear; and a second transmission gear at the other end of the first transmission axis to engage the first gear part.

In still another preferred embodiment, the rotational force of the second inner axis is transmitted to said first main axis by means of: a second gear part formed at an inside end of the first main axis; a second drive gear coupled to an inside end of the second inner axis; a second transmission axis rotatably supported by a support within the case to extend horizontally; a third transmission gear installed at one end of the second transmission axis to engage the second drive gear; and a fourth transmission gear at the other end of the second transmission axis to engage the second gear part.

Other aspects and preferred embodiments of the invention are discussed infra.

According to the present invention, the pair of the generating means comprising stators and rotors are installed in a case fixed at the top of the pillar, and the pair of the generating means operate by means of rotating forces of the wings, which rotate in opposite directions with respect to a wind direction, so that it is possible to improve the generating efficiency. If coils are installed serving as a stator, it is unnecessary to include an extra slip ring for generating the electricity to thereby reduce load and improve the generating electricity. Also, the power transmitting means for mutually providing rotational forces between two generating means are included to thereby accelerate rotational speeds of main axes which rotate the rotors. Accordingly, it is possible to expect the improvement in the generating efficiency.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
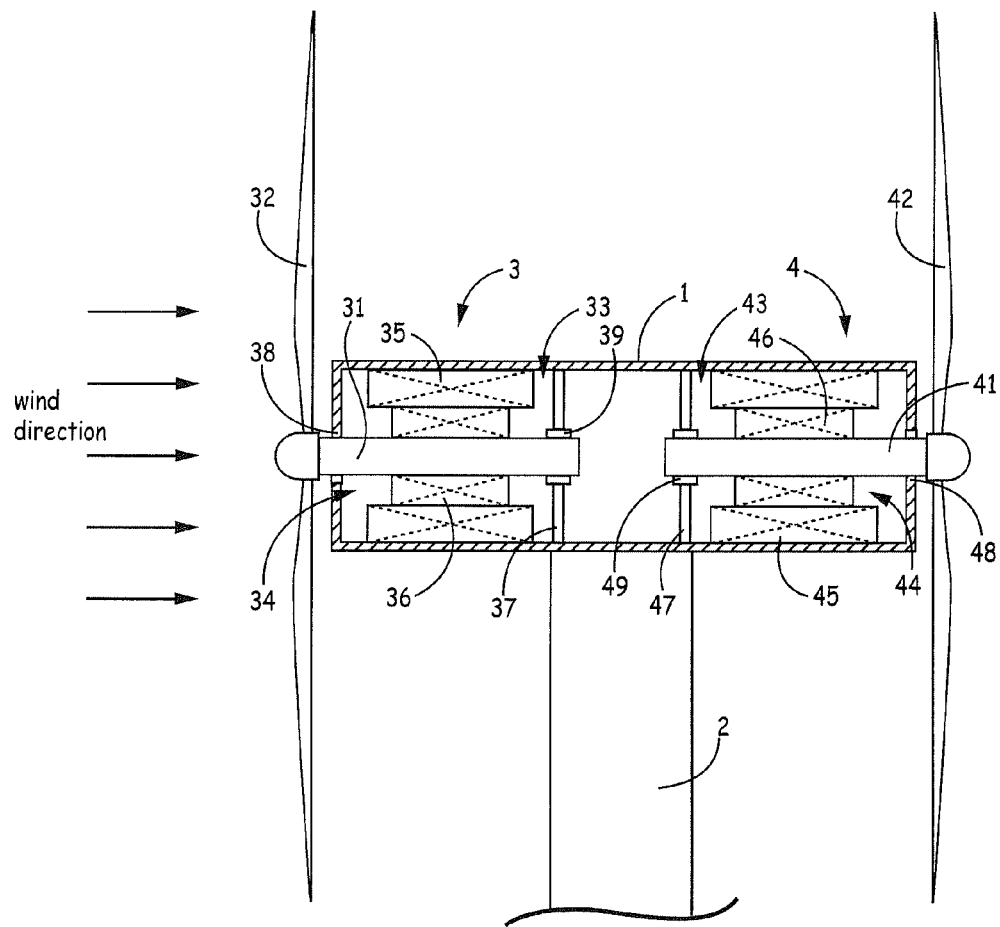
FIG. 1 is a cross-sectional view illustrating a first embodiment of a wind power generator according to the present invention.

Reference numerals set forth in the Drawings includes reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
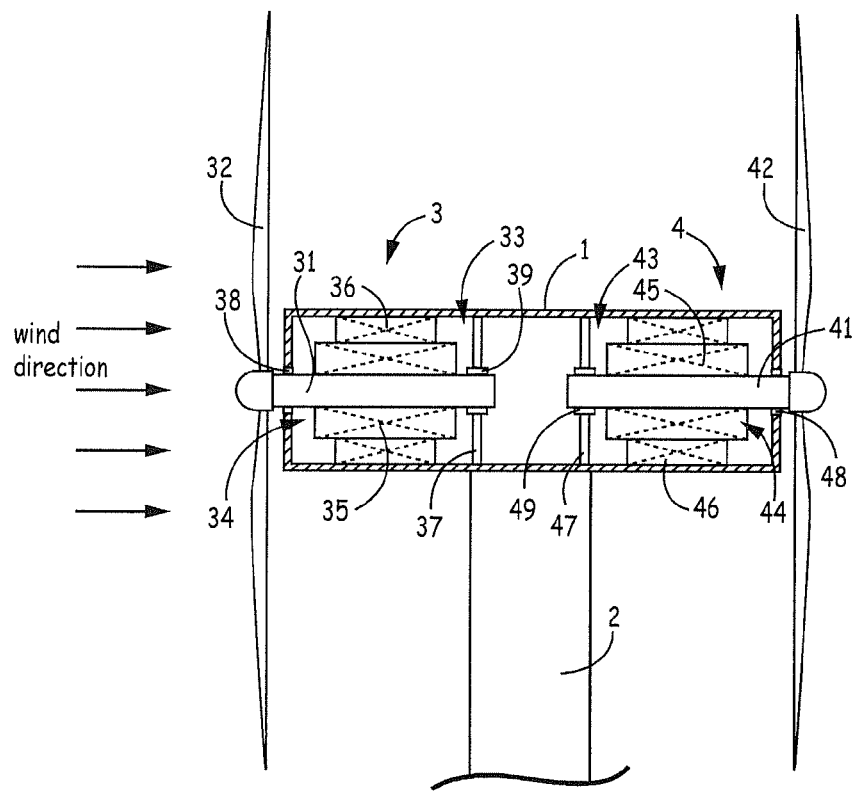
FIGS. 2 and 3 are a cross-sectional view illustrating a variant of the first embodiment according to the present invention shown in FIG. 1; and, FIG. 4 is a cross-sectional view illustrating a second embodiment of a wind power generator according to the present invention.
Figure 3:
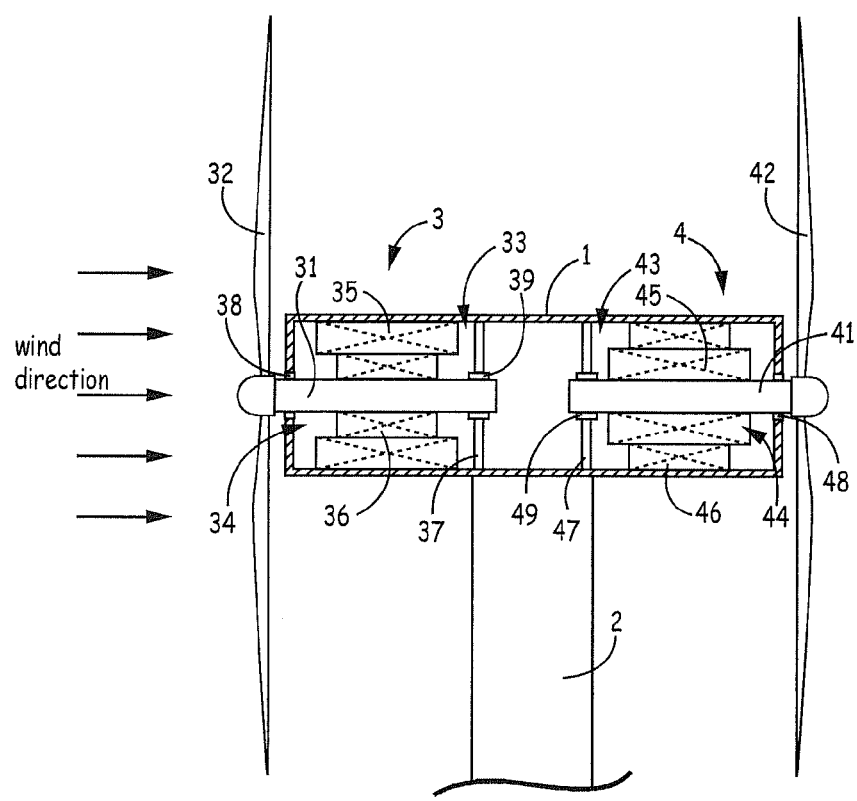

Referring to FIGS. 1-3, the first embodiment of the present invention is illustrated. On the top of a pillar 2 erected on the ground with a predetermined distance, a case 1 is installed to rotate in dependence of a wind direction.

A first main axis 31, which extends horizontally within a case 1, is coupled to one side of the case 1 by way of a bearing. A first main wing 32 is mounted to an end of the first main axis 31, and thus the first main wing 32 may rotate the first main axis 31 while the first main wing 32 is rotated by the wind. A first rotor 34 is coils or a permanent magnet installed on the first main axis 31. A first stator 33 is a permanent magnet or coils installed on an inner surface of the case 1 to correspond to the first rotor 34. The first rotator 34 and the first stator 33 serve as a first generating means 3.

A second main axis 41, which extends horizontally within the case 1, is coupled to the other side of the case 1 by way of a bearing. A second main wing 42 is mounted to an end of the second main axis 41, and thus the second main wing 42 may rotate the second main axis 41 while the second main wing 42 is rotated by the wind. A second rotor 44 is coils or a permanent magnet installed on the second main axis 41. A second stator 43 is a permanent magnet or coils installed on an inner surface of the case 1 to correspond to the second rotor 44. The second rotator 44 and the second stator 43 serve as a second generating means 4.

The first embodiment of the present invention described above comprises the first generating means 3 and the second generating means 4 installed within a single case 1, so that the more efficient generation can be effected.

The first generating means 3 is installed at a left end of the case 1, while the second generating means 4 is installed at a right end of the case 2. As illustrated in FIG. 1, a first permanent magnet 36 is installed on the first main axis 31 to thereby serve as the first rotor 34 of the first generating means 3, while first coils 35 are installed on the inner surface of the case 1 to thereby serve as the first stator 33 to correspond to the first rotor 34. Also, second coils 45 are installed on the right side of the inner surface of the case 1 to thereby serve as the second stator 43 of the second generating means 4, while a permanent magnet 46 is installed on the second main axis 41 to thereby serve as the second rotor 44 of the second generating means 4.

The first main axis 31 is included in the left half of the case 1. One end of the first main axis 31 is maintained by way of the bearing 38 which is fitted at an end of the case 1, while the other end of the first main axis 31 is coupled to the bearing 39 which is supported by a first support 37 at the middle of the case 1. The first main wing 32, which is rotated by the wind, is coupled to the end of the first main axis 31.

The second main axis 41 is included in the right half of the case 1. One end of the second main axis 41 is maintained by way of the bearing 48 which is fitted at the other end of the case 1, while the other end of the second main axis 41 is coupled to the bearing 49 which is supported by a second support 47 at the middle of the case 1. The second main wing 42, which is rotated by the wind in a rotational direction opposite to that of the first main wing 32, is coupled to the end of the second main axis 41.

When there is a wind from a left side of FIG. 1 showing the wind power generator having the above-described configuration, the first main wing 32 is rotated in one direction, whereas the second main wing 42 is rotated in the other direction. Thereby, the first main axis 31 and the second main axis 41 are rotated to rotate the first rotor 34 and the second rotor 44, respectively, so that the electricity is excited in the first stator 33 and the second stator 34, i.e., the firs and second coils. Thus, the electric power generation is attained.

The wind power generator illustrated in FIG. 1 includes the pair of the generation means in a single case 1, and thus the generating efficiency can be improved compared to the conventional art. Also, the coils serving as the stator are fixed not to rotate, and thus it is unnecessary to install a slip ring for withdrawing the electricity on an axis. Thereby, it is possible to reduce the load and improve the generating efficiency.

FIG. 2 illustrates a modified embodiment of the first embodiment, wherein permanent magnets 36 and 46 are adopted as the stators 33 and 43 and wherein the coils 35 and 45 are adopted as the rotors 34 and 44.

FIG. 3 illustrates another modified embodiment of the first embodiment, wherein the coils 35 are adopted as the stator 33 of the first generating means 3 and the permanent magnet 36 is adopted as the rotor 34 and wherein the permanent magnet 46 is adopted as the stator 43 of the second generating means 4 and the coils 45 are adopted as the rotator 44.

Although not specifically illustrated in the drawings, means for accelerating rotational speed is provided between the first main axis 31 and the second main axis 41 as represented by a dotted line in FIG. 3.

Figure 4:
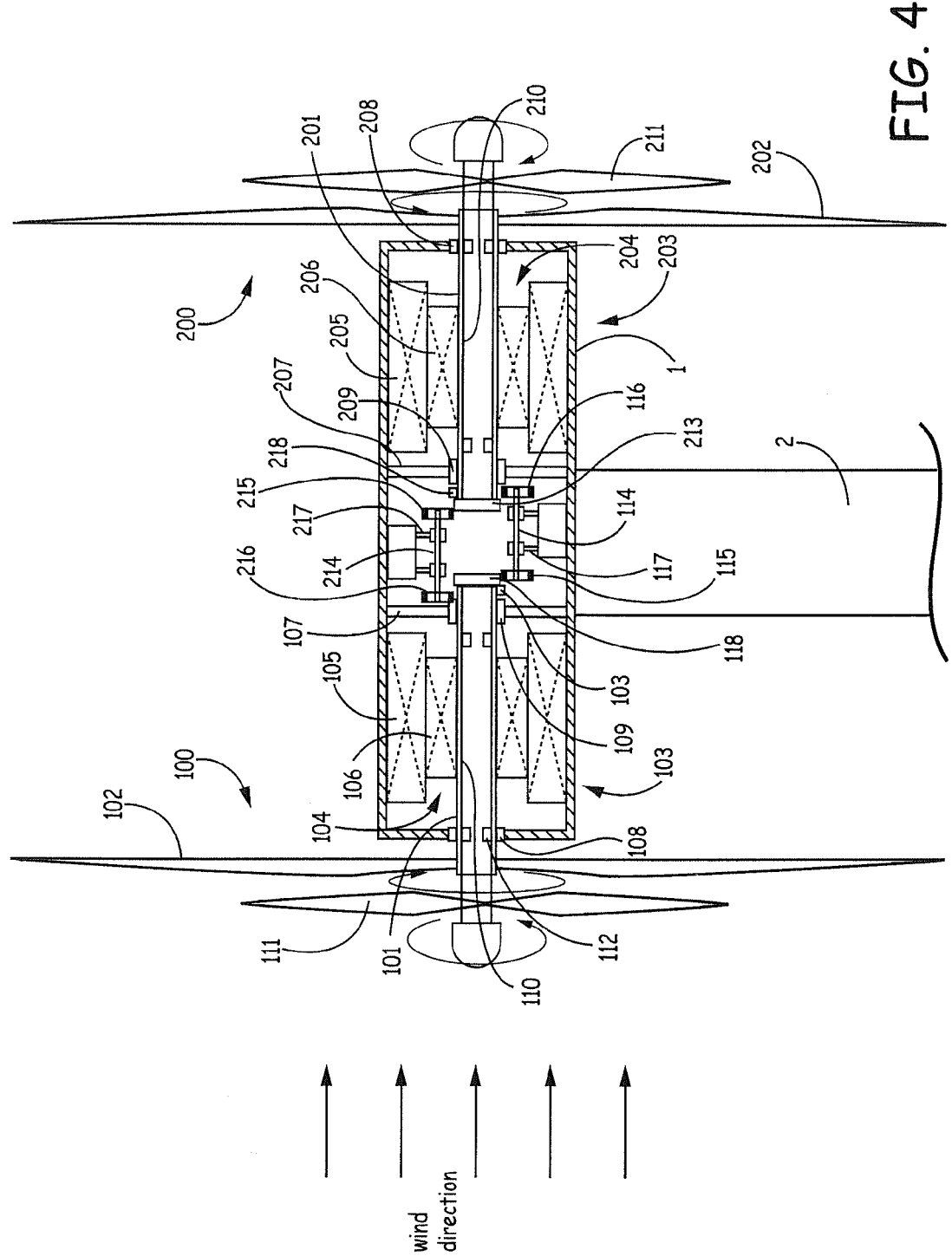

FIG. 4 illustrates a second embodiment of the present invention.

On the top of a pillar 2 erected from the ground with a predetermined distance, a case 1 is installed to rotate depending on a wind direction.

A first main axis 101 in the form of a hollow shaft, which extends horizontally within a part of a case 1, is coupled to the case 1 at one side by way of bearings 108 and 109. A first main wing 102 is mounted to an end of the first main axis 101, and thus the first main wing 102 may rotate the first main axis 101 while the first main wing 102 is rotated by the wind. A first rotor 104 is attained by means of coils or a permanent magnet installed on the first main axis 101. A first stator 103 is attained by means of a permanent magnet or coils installed on an inner surface of the case 1 to correspond to the first rotor 104. A first inner axis 110 is installed within a first main axis 101 by way of bearings 112. A first auxiliary wing 111 is mounted to an end of the first inner axis 110. The first auxiliary wing 111 is rotated by the wind in a rotational direction opposite to that of the first main wing 102, and thus it rotates the first inner axis 110 in a rotational direction opposite to that of the of the first main axis 101. The first rotor 104 and the first stator 103 serve as a first generating means 3, along with the first auxiliary wing. The rotational force of the first inner axis 110 is transmitted to a second main axis 201 of second generating mans 4 to thereby improve the generating efficiency of the second generating means 4, as discussed hereinbellow.

The second main axis 201 in the form of the hollow shaft, which extends horizontally within the other part of a case 1, is coupled to the case 1 at the other side by way of bearings 208 and 209. A second main wing 202 is mounted to an end of the first main axis 201, and thus the second main wing 202 may rotate the second main axis 201 while the second main wing 202 is rotated by the wind in a rotational direction opposite to that of the first main wing 102. A second rotor 204 is attained by means of coils or a permanent magnet installed on the second main axis 201. A second stator 203 is attained by means of a permanent magnet or coils installed on an inner surface of the case 1 to correspond to the second rotor 204. A second inner axis 210 is installed within a second main axis 201 by way of bearings 212. A second auxiliary wing 211 is mounted to an end of the second inner axis 210. The second auxiliary wing 211 is rotated by the wind in a rotational direction opposite to that of the second main wing 202, and thus it rotates the second inner axis 210 in a rotational direction opposite to that of the of the second main axis 201. The second rotor 204 and the second stator 203 serve as the second generating means 4, along with the second auxiliary wing 211. The rotational force of the second inner axis 210 is transmitted to the first main axis 101 of the first generating mans 3 to thereby improve the generating efficiency of the first generating means 3.

In the configuration described above, the bearings 109 and 209 are respectively installed at a first support 107 and a second support 207 fixed on the inner wall of the case 1, so that they serve to rotatably support the ends of the first and second axes 101 and 201.

In the meantime, means for transmitting the rotational force of the first inner axis 110 to the second main axis 201 includes: a first gear part 218 formed at an inside end of the second main axis 201; a first drive gear 113 coupled to an inside end of the first inner axis 110; a first transmission axis 114 rotatably supported by a third support 117 within the case 1 to extend horizontally; a first transmission gear 115 installed at one end of the first transmission axis 114 to engage the first drive gear 113; and a second transmission gear 116 at the other end of the first transmission axis 114 to engage the first gear part 218.

Also, means for transmitting the rotational force of the second inner axis 210 to the first main axis 101 includes: a second gear part 118 formed at an inside end of the first main axis 101; a second drive gear 213 coupled to an inside end of the second inner axis 210; a second transmission axis 214 rotatably supported by a fourth support 217 within the case 1 to extend horizontally; a third transmission gear 215 installed at one end of the second transmission axis 214 to engage the second drive gear 213; and a fourth transmission gear 216 at the other end of the second transmission axis 214 to engage the second gear part 118.

The operation of the second embodiment of the wind power generator according to the present invention will be detailed herein below.

It is assumed that when there is the wind from the left side of the drawings, the first main wing 102 rotates in a clockwise direction with respect to the wind, while the second main wing 202 rotates in a counter-clockwise direction As the first main wing 102 rotates in the clockwise direction and the second main wing 202 rotates in the counter-clockwise direction, the first main axis 101 having the first main wing 102 and the second main axis 201 having the second main wing 202 rotate in opposite directions, so that the first rotor 104 of the first generating means 100 and the second rotor 204 of the second generating means 200 are rotated to thereby generate the electricity in the first and second stators 103 and 203.

Here, the first auxiliary wing 111 rotates in the counter-clockwise direction opposite to the rotational direction of the first main wing 102 to rotate the first inner axis 110 in the counter-clockwise direction, so that the rotational force of the first inner axis 110 is transmitted to the second main axis 201 in the order of the first drive gear 113, the first transmission gear 115, the first transmission axis 114, the second transmission gear 116 and the first gear part 218. Thereby, the rotational speed of the second main axis 201 is accelerated and the generating efficiency of the second generating means 200 is enhanced.

The second auxiliary wing 211 rotates in the clockwise direction opposite to the rotational direction of the second main wing 202 to rotate the second inner axis 210 in the clockwise direction, so that the rotational force of the second inner axis 210 is transmitted to the first main axis 101 in the order of the second drive gear 213, the third transmission gear 215, the second transmission axis 214, the fourth transmission gear 216 and the second gear part 118. Thereby, the rotational speed of the first main axis 101 is accelerated and the generating efficiency of the first generating means 100 is enhanced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A wind power generator comprising:
   a case;
   a first rotor having a first main axis in the form of a hollow shaft rotatably installed within a part of said case, a first main blade mounted to an end of said first main axis, coils or a permanent magnet installed on said first main axis;
   a first stator having a permanent magnet or coils installed on an inner wall of said case to correspond to said first rotor;
   a first auxiliary blade mounted to an end of a first inner axis which is rotatably installed within said first main axis;
   a second rotor having a second main axis in the form of a hollow shaft rotatably installed within the other part of said case, a second main blade mounted to an end of said second main axis, coils or a permanent magnet installed on said second main axis;
   a second stator having a permanent magnet or coils installed on the inner wall of said case to correspond to said second rotor; and a second auxiliary blade mounted to an end of a second inner axis which is rotatably installed within said second main axis, wherein said first main blade and said second main blade rotate in rotational directions opposite to those of said first auxiliary blade and said second auxiliary blade, respectively, and, wherein the rotational force of said first inner axis and the rotational force of said second inner axis may be transmitted to said second main axis and said first main axis, respectively.

2. A wind power generator as claimed in claim 1, wherein said case is installed on the top of a pillar erected on the ground to be rotatable in dependence of a wind direction.

3. A wind power generator as claimed in claim 1, wherein the rotational force of the first inner axis is transmitted to the second main axis by means of: a first gear part formed at an inside end of the second main axis; a first drive gear coupled to an inside end of the first inner axis; a first transmission axis rotatably supported by a support within the case to extend horizontally; a first transmission gear installed at one end of the first transmission axis to engage the first drive gear; and a second transmission gear at the other end of the first transmission axis to engage the first gear part.

4. A wind power generator as claimed in claim 1, wherein the rotational force of the second inner axis is transmitted to said first main axis by means of: a second gear part formed at an inside end of the first main axis; a second drive gear coupled to an inside end of the second inner axis; a second transmission axis rotatably supported by a support within the case to extend horizontally; a third transmission gear installed at one end of the second transmission axis to engage the second drive gear; and a fourth transmission gear at the other end of the second transmission axis to engage the second gear part.

* * * * *